United States Patent
Aguirre et al.

(10) Patent No.: US 8,520,544 B2
(45) Date of Patent: Aug. 27, 2013

(54) INTELLIGENT REDUCTION OF INTERFERENCE TO PUBLIC SAFETY WIRELESS NETWORKS

(75) Inventors: Sergio Aguirre, Southlake, TX (US); Raafat Edward Kamel, Little Falls, NJ (US); Lalit Ratilal Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 254 days.

(21) Appl. No.: 12/979,115

(22) Filed: Dec. 27, 2010

(65) Prior Publication Data

US 2012/0163202 A1    Jun. 28, 2012

(51) Int. Cl.
*G01R 31/08*  (2006.01)
*G06F 11/00*  (2006.01)
*G08C 15/00*  (2006.01)
*H04J 1/16*  (2006.01)
*H04J 3/14*  (2006.01)
*H04L 1/00*  (2006.01)
*H04L 12/26*  (2006.01)

(52) U.S. Cl.
USPC ........... 370/252; 370/241; 370/335; 370/329; 370/310; 455/11.1; 455/422.1; 455/436; 455/67.11

(58) Field of Classification Search
None
See application file for complete search history.

(56) References Cited

U.S. PATENT DOCUMENTS

| 7,774,012 | B2 * | 8/2010 | Chowdhury et al. ......... 455/518 |
| 2001/0050592 | A1 * | 12/2001 | Wright et al. .................... 330/2 |
| 2005/0179607 | A1 | 8/2005 | Gorsuch et al. |
| 2005/0267677 | A1 * | 12/2005 | Poykko et al. ................ 701/207 |
| 2006/0025160 | A1 * | 2/2006 | Kodali et al. .............. 455/456.5 |
| 2007/0173303 | A1 | 7/2007 | Viorel et al. |
| 2008/0057934 | A1 * | 3/2008 | Sung et al. ................ 455/422.1 |
| 2009/0280814 | A1 * | 11/2009 | Farnsworth ................... 455/436 |
| 2010/0267333 | A1 * | 10/2010 | Lamm et al. ................. 455/11.1 |
| 2010/0311321 | A1 | 12/2010 | Norin |
| 2010/0313232 | A1 | 12/2010 | Norin |
| 2011/0274092 | A1 * | 11/2011 | Liu et al. ....................... 370/335 |

OTHER PUBLICATIONS

3GPP TS 36.101 V9.5.0 (Oct. 2010): $3^{rd}$ Generation Partnership Project; Technical Specification Group Radio Access Network; Evolved Universal Terrestrial Radio Access (E-UTRA); User Equipment (UE) radio transmission and reception (Release 9); 2010; 187 pages.

* cited by examiner

*Primary Examiner* — Ian N. Moore
*Assistant Examiner* — Eric H Wang

(57) ABSTRACT

Interference, from fixed wireless terminals, communicating with, for example, an LTE network, can be intelligently reduced for nearby public safety networks. A fixed terminal may, for instance, determine a signal strength of radio signals from a public safety wireless network, and perform a threshold comparison of the signal strength to determine whether the fixed terminal is located in an edge area of a cell of the public safety wireless network. The fixed terminal may reduce transmission power, to the network of the fixed terminal (e.g., the LTE network), when the threshold comparison indicates that the device is located in the edge area of the cell of the public safety wireless network.

20 Claims, 9 Drawing Sheets

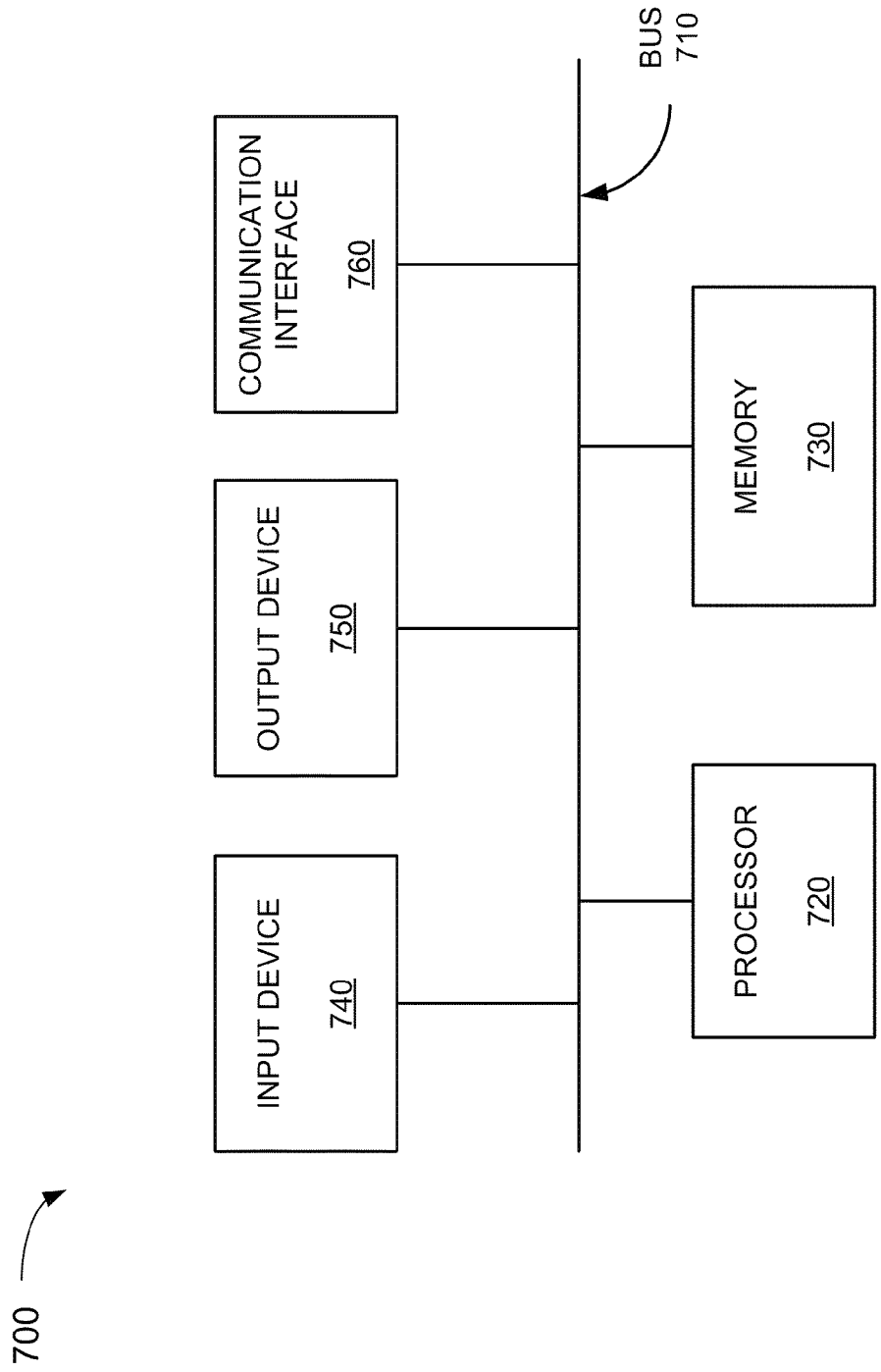

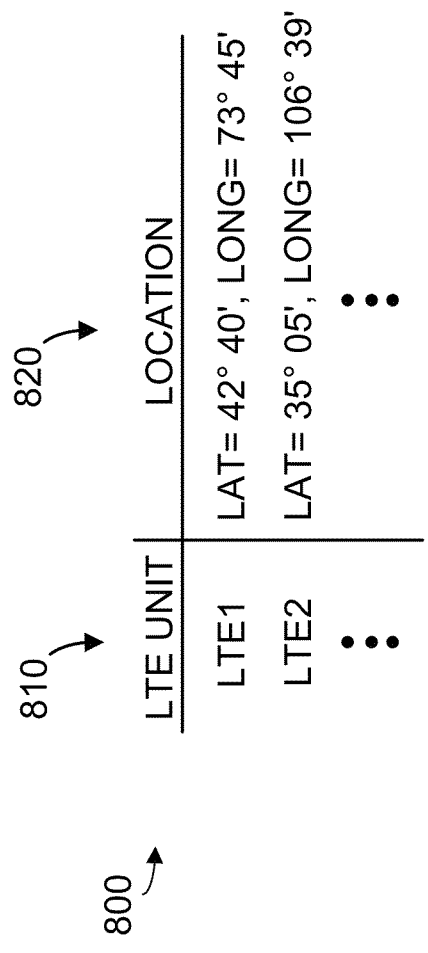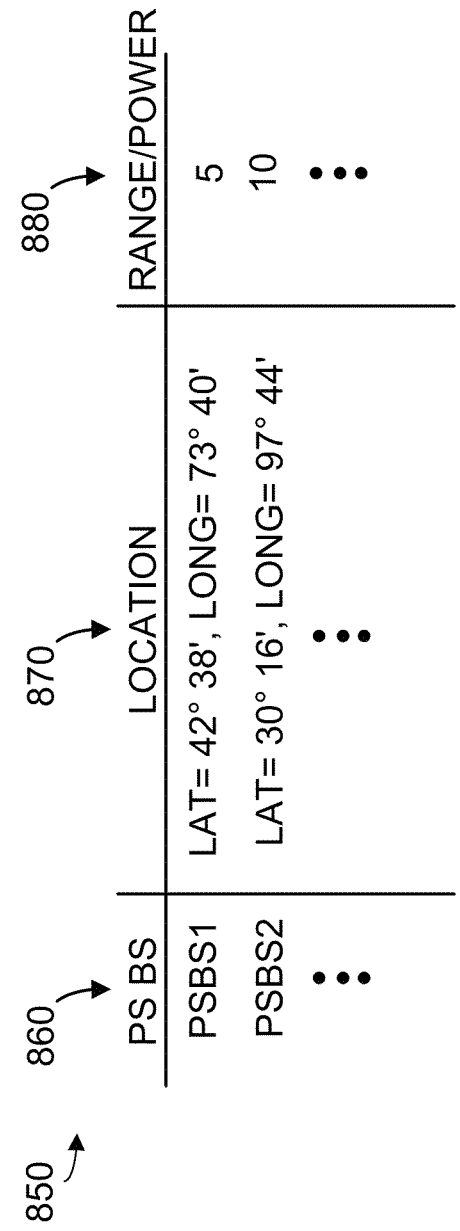
Fig. 8A
Fig. 8B

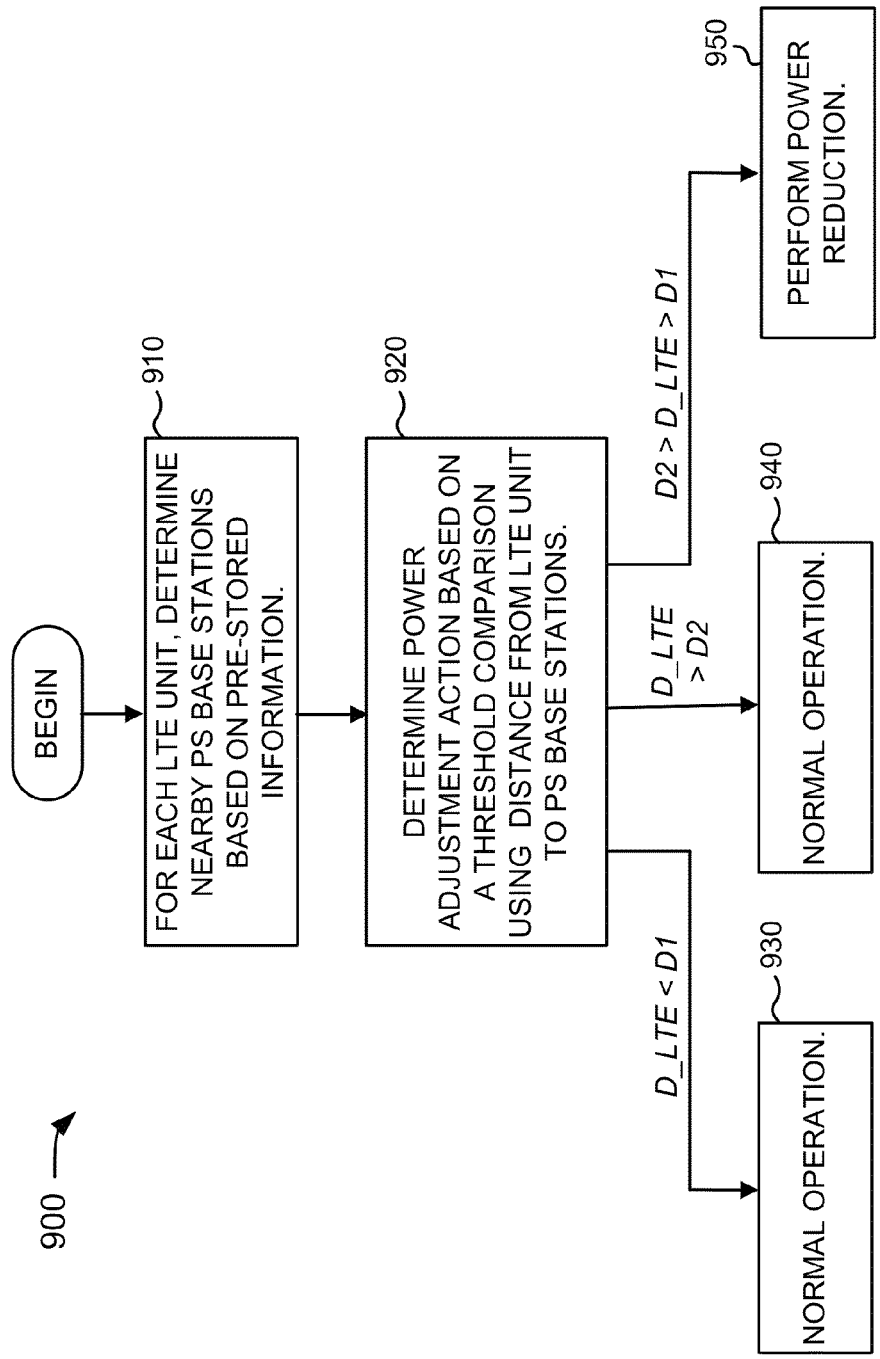

INTELLIGENT REDUCTION OF INTERFERENCE TO PUBLIC SAFETY WIRELESS NETWORKS

BACKGROUND INFORMATION

A public safety network is a wireless communications network used by emergency services organizations, such as police, fire, and emergency medical services, to prevent or respond to incidents that harm or endanger persons or property. Some public safety networks may be constructed similarly to commercial wireless networks, in which one or more base stations provide wireless services to mobile terminals used by the public safety personnel.

Some commercial wireless networks, such as those operating in the upper 700 MHz band, are designed with the ability to reduce power used by devices in the wireless networks in order to avoid interfering with public safety networks. Wireless networks based on the 3GPP Long Term Evolution (LTE) standard may, for example, include the ability to instruct mobile terminals in a cell to reduce the power used by the mobile terminals. For example, an LTE base station (eNodeB) may use a power reduction scheme, referred to as additional maximum power reduction (A-MPR), to reduce the signal strength of all the terminals within a cell so that public safety terminals operating in an adjacent band will not be adversely affected.

BRIEF DESCRIPTION OF THE DRAWINGS

FIG. 7 is a diagram of example components of a device according to an implementation described herein;

FIGS. 8A and 8B are diagrams illustrating an example of data structures implemented by the device of FIG. 7; and FIG. 9 is a flow diagram illustrating a process for performing interference reduction with a wireless public safety network.

DETAILED DESCRIPTION OF PREFERRED EMBODIMENTS

The following detailed description refers to the accompanying drawings. The same reference numbers in different drawings identify the same or similar elements.

Systems and/or methods described herein may relate to interference reduction for fixed wireless terminals based on an intelligent determination of whether a particular fixed wireless terminal is potentially affecting public safety terminals. In one implementation, the fixed wireless terminal may include an auxiliary receiver that measures the signal strength of an overlapping public safety wireless network. Based on the measured signal strength, the fixed wireless terminal may determine whether to modify its output power so as to reduce possible interference with the public safety network. In another possible implementation, a database of public safety networks, potentially including locations and broadcasting strengths of base stations in the public safety networks, may be maintained. The database may be used to determine whether a particular fixed wireless terminal should modify its output power to reduce possible interference with the public safety network.

Figure 1:
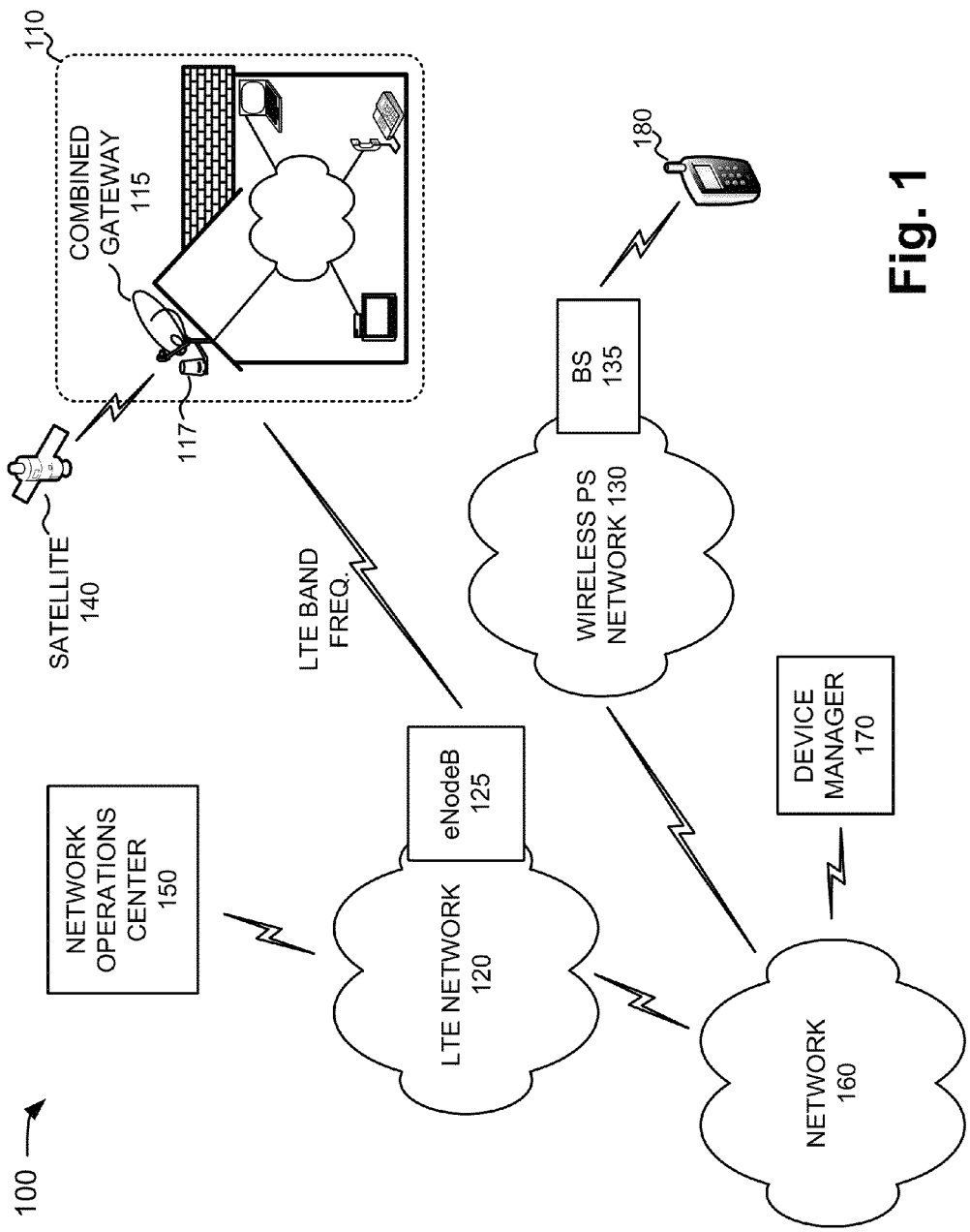
FIG. 1 is a diagram of a system according to an implementation described herein.

FIG. 1 is a diagram of a system 100 according to an implementation described herein. As shown in FIG. 1, system 100 may include customer premises 110, an LTE network 120, a wireless public safety (PS) network 130, a satellite 140, a network operations center 150, a network 160, a device manager 170, and a public safety (PS) terminal 180.

Customer premises 110 may include a combined gateway 115 and one or more devices connected to combined gateway 115. Devices in customer premises 110 may include, for example, set-top boxes (STBs), televisions, computers, voice-over-Internet-protocol (VoIP) devices, home networking equipment (e.g., routers, cables, splitters, local gateways, etc.), gaming devices, etc. Devices within customer premises 110 may be connected via wired connections (e.g., coaxial cable, Telecommunications Industry Association (TIA) Category 5 ("Cat 5") cable, TIA Cat 3 cable, etc.) and/or wireless connections (e.g., using network devices such as those available under the IEEE 802.11 wireless local wireless network (LAN) standards).

Customer premises 110 may connect to LTE network 120 through a two-way wireless connection using LTE band frequency signals and connect to satellite 140 through a one or two-way (e.g., downlink providing video content and uplink carrying control messages for Single Wire Multiswitch (SWiM) circuits) wireless connection using satellite TV band frequency signals. Customer premises 110 may combine LTE functionality with satellite TV service. Using combined gateway 115, both broadband (over LTE) service and satellite TV service (e.g., via satellite 140) may be brought into the customer premises network over, for example, a single coaxial line.

Combined gateway 115 may particularly include an LTE unit 117. LTE unit 117 may be generally responsible for communicating with LTE network 120.

LTE unit 117 may be considered a "fixed" terminal with respect to LTE network 120. In contrast to mobile terminals (e.g., portable phones) in LTE network 120, LTE unit 117, once installed, may be stationary. In some implementations, devices other than LTE unit 117 may be used, as described herein, as a fixed terminal. For example, other types of fixed terminals may include computer devices situated at a home or office, set-top boxes, etc.

LTE network 120 may include a core network architecture of the Third Generation Partnership Project (3GPP) LTE wireless communication standard (e.g., an evolved packet core (EPC) network). LTE network 120 may include a packet-switched core network that supports high-speed wireless and wireline broadband access technologies. Additionally, LTE network 120 may provide packet-switched voice services (e.g., which are traditionally circuit-switched) using an Internet Protocol Multimedia Subsystem Multimedia Subsystem (IMS) network (not shown in FIG. 1). LTE network 120 may include an Evolved NodeB (eNodeB) 125. In addition, LTE network 120 may include one or more other network devices (not shown), such as one or more mobility management entities (MMES), serving gateways (SGWs), packet data network (PDN) gateways (PGW), and/or other devices.

eNodeB 125 may include an LTE base station that may cover a particular geographic area (a "cell") serviced by LTE network 120. eNodeB 125 may include one or more devices that receive information, such as voice, video, text, and/or other data, from network devices and/or that transmit the information to customer premises 110 via an air interface. eNodeB 125 may also include one or more devices that receive information from devices in customer premises 110 via an air interface and/or that transmit the information to other network devices.

Satellite 140 may provide multimedia content from, for example, a direct broadcast satellite (MS) service provider (not shown in FIG. 1). Satellite 140 may provide a downlink signal over a designated satellite TV band frequency (e.g., in the range of 950 megahertz (MHz) to 2150 MHz). The downlink signal may be received using a satellite antenna/receiver system at customer premises 110 to present satellite TV content to a user. In some implementations, satellite 140 may not be used at customer premises 110. Instead, the connection of customer premises 110 to the telecommunication network may be only through LIE network 120.

While implementations herein are described primarily in the context of broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Network operations center 150 may include one or more devices (e.g., server devices) from which administrators supervise, monitor, and maintain LIE network 120 and/or customer premises 110. For example, network operations center 150 may be responsible for analyzing problems, performing troubleshooting, communicating with site technicians and other network operations centers, and tracking problems through to resolution. Network operations center 150 may connect to LIE network 120 via wired and/or wireless connections.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of these or other types of networks. In one implementation, network 160 may include a packet-based data network, such as the Internet. Customer premises 110 may connect, through LTE network 120, to network 160.

Device manager 170 may include one or more server devices that manage the operation of combined gateway 115. For example, device manager 170 may maintain data regarding the operation of LTE unit 117 and may send messages to LTE unit 117 relating to the configuration or operation of LTE unit 117.

In addition, device manager 170 and/or network operations center 150 may maintain information relating to the coverage areas and/or signal strengths of wireless public safety network 130. For example, in one implementation, LTE unit 117 may inform device manager 170 and/or network operations center 150 of the measured strength of public safety signals. Alternatively or additionally, device manager 170 and/or network operations center 150 may maintain a database relating to wireless public safety network 130, such as a database of the locations of base stations 135 of wireless public safety network 130.

Wireless public safety network 130 may include one or more networks that are used by or dedicated to public safety personnel, such as police, fire, or medical personnel. Wireless public safety network 130 may include base stations 135 that provide the radio interface for terminals, such as PS terminals 180, in the public safety wireless network. Wireless public safety network 130 may be a cellular network operating in the 700 MHz radio band. In general, compared to wireless services provided by LTE network 120, wireless public safety network 130 may be a less "dense" network in which there are fewer base stations 135 per unit area than eNodeBs 125. The eNodeBs 125 of LTE network 120 and base stations 135 of wireless public safety network 130 may provide cellular coverage areas that overlap one another.

PS terminal 180 may include mobile or fixed communication devices, such as cell phones, smart phones, in-vehicle phones, etc., that may be used to wirelessly communicate with wireless PS network 130. Typically, PS terminal 180 will be used by public safety personnel.

Although FIG. 1 shows example components of system 100, in other implementations, system 100 may include fewer components, different components, differently arranged components, and/or additional components than those depicted in FIG. 1. For example, system 100 will typically include numerous customer premises 110 and PS safety terminals 180. Alternatively, or additionally, one or more components of system 100 may perform one or more tasks described as being performed by one or more other components of system 100.

Figure 2:
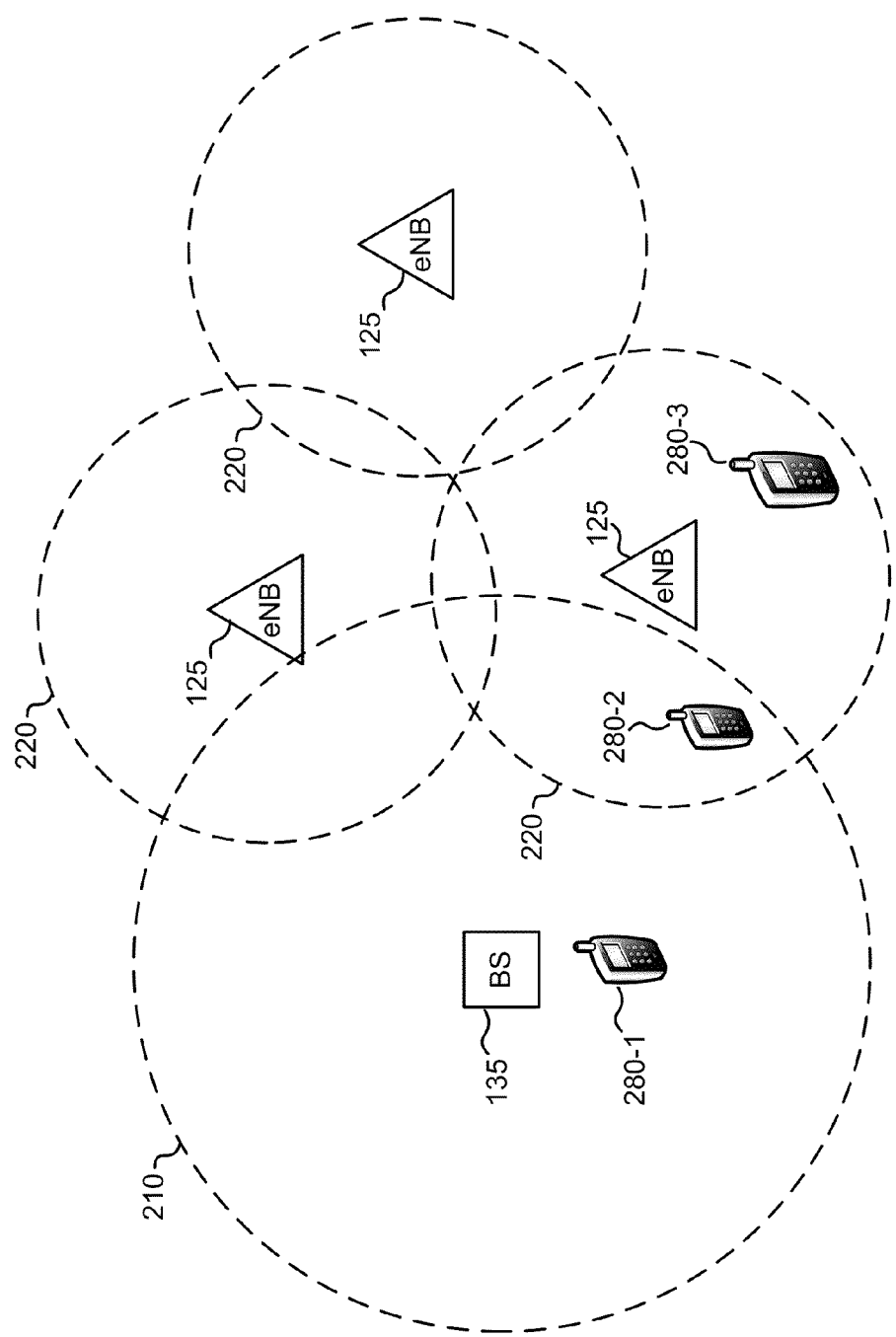
FIG. 2 is a diagram conceptually illustrating cellular coverage areas by different networks.

FIG. 2 is a diagram conceptually illustrating cellular coverage by eNodeBs 125 (labeled as "eNB" in FIG. 2) of LIE network 120, and base stations 135, of wireless public safety network 130. In FIG. 2, one base station 135 and three eNodeBs 125 are illustrated. Assume base station 135 is associated with corresponding coverage area 210 and eNodeBs 125 are associated with respective corresponding coverage areas 220. Three public safety terminals 280-1, 280-2, and 280-3, each corresponding to PS terminal 180, are also illustrated in FIG. 2.

The various public safety terminals 280 shown in FIG. 2 may, based on their proximity to base station 135, experience different signal reception profiles. Public safety terminal 280-1, for example, is relatively close to base station 135 and may thus establish a good connection with base station 135. Interference from eNodeBs 125 may generally not be an issue with public safety terminal 280-1. Public safety terminal 280-2, however, is located near the periphery of the area covered by base station 135. The signal received by public safety terminal 280-2 may be relatively weak and may be particularly vulnerable to interference generated by other nearby terminals, such as from LTE unit 117, when transmitting to LTE network 120 via eNodeBs 125. The signal received by public safety terminal 280-3 may be too weak to enable communications with base station 135. For this terminal, assume that modifying the power of a device communicating with eNodeBs 125 will not enable public safety terminal 280-3 to connect to wireless public safety network 130.

Figure 3:
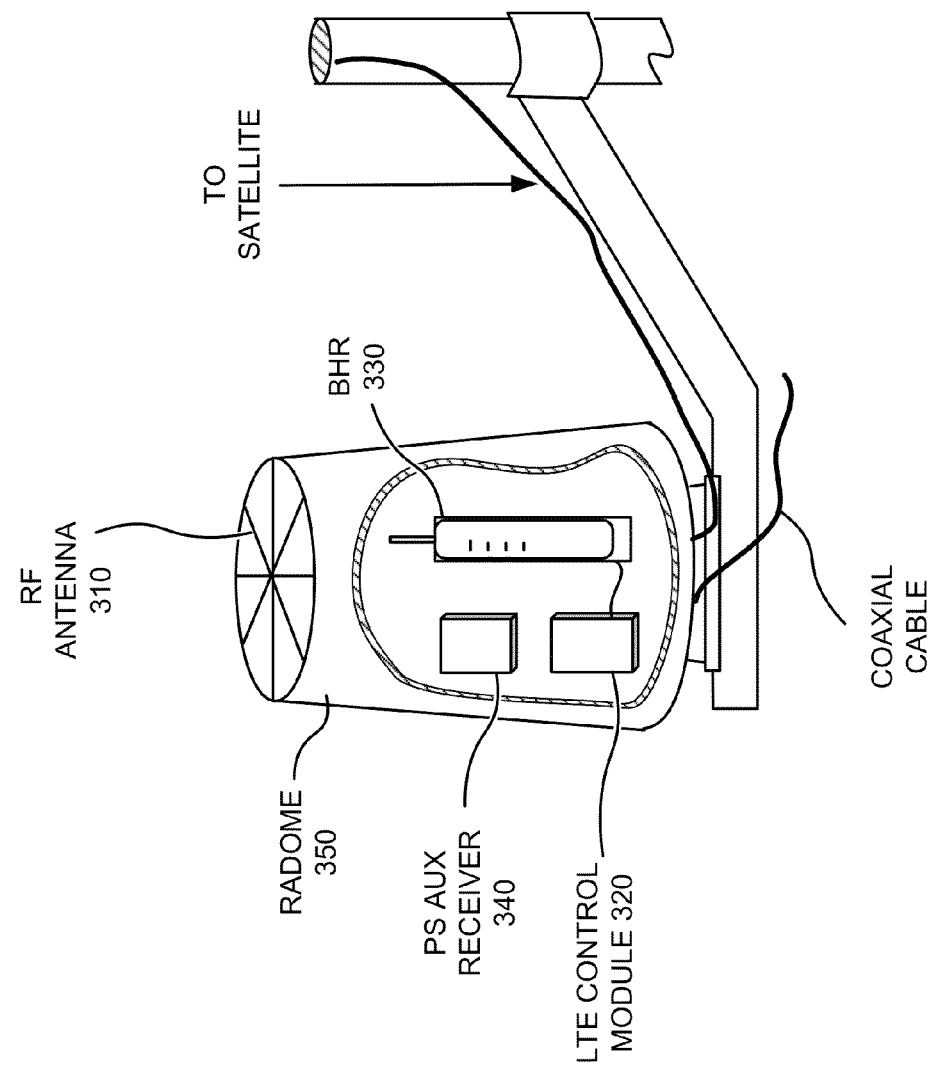
FIG. 3 is a diagram of example components of the LTE unit of FIG. 1.

FIG. 3 is a diagram of example components of LTE unit 117. As shown in FIG. 3, LTE unit 117 may include a radio frequency (RF) antenna 310, an LIE control module 320, a broadband home router (BHR) 330, a public safety (PS) auxiliary receiver 340, and a radome 350. A coaxial cable, or other type of cable, may extend from LIE unit 117 into the customer premises.

RF antenna 310 may include an antenna to transmit and/or receive RF signals over the air. RF antenna 310 may, for example, receive RF signals from LTE control module 320/BHR 330 and transmit the RF signals over the air. Also, RF antenna 310 may, for example, receive RF signals over the air and provide the RF signals to LTE control module 320/BHR 330. In one implementation, for example, LTE control module 320/BHR 330 may communicate with a base station (e.g., eNodeB 125) connected to a network (e.g., LTE network 120) to send and/or receive signals. In implementations herein, RF antenna 310 may be enclosed by radome 350, integrated with radome 350, or external to radome 350.

LTE control module 320 may include hardware or a combination of hardware and software to control the operation of LTE unit 117. For example, LTE control module 320 may include a transceiver to receive/transmit RF signals to RF antenna 310 and provide a digital interface to BHR 330. LTE control module 320 may communicate with BHR 330 via, for example, a USB cable. As will be described in more detail below, LTE control module 320 may include logic to selectively control the power of signals output to RF antenna 310 so that interference with wireless public safety network 130 can, at certain times, be reduced.

BHR 330 may include one or more devices that buffer and forward data packets. For example, BHR 330 may receive data packets from eNodeB 125 (e.g., via LIE control module 320) and forward the data packets toward user devices within customer premises 110. In addition, BHR 330 may receive data packets from devices within customer premises 110 and forward the data packets toward recipient devices (e.g., a service provider) via LIE network 120. BHR 330 may include a bridge device to receive signals from LIE control module 320 via, for example, a USB cable and convert the signals to, for example, an Ethernet over coax signal.

PS auxiliary receiver 340 may include circuitry to detect the presence of a public safety signal, such as a narrowband signal transmitted by base stations 135 in wireless public safety network 130. PS auxiliary receiver 340 may output one or more values, to LTE control module 320, quantifying the detected strength of the public safety signal. PS auxiliary receiver 340 may include a separate antenna from RF antenna 310 or share the same antenna. In one implementation, PS auxiliary receiver 340 may be a streamlined scanner that measures the strength of overhead channels associated with wireless public safety network 130. In another possible implementation, PS auxiliary receiver 340 may include a narrowband power detector that measures the total power over the bandwidth to which the receiver is tuned (e.g., the bandwidth of wireless public safety network 130). Ideally, measurements by PS auxiliary receiver 340 should be non-invasive to wireless PS network 130 and should not interfere with the normal operation of LTE unit 117.

Radome 350 (shown with cut-away view to reveal LTE control module 320, BHR 330, and PS auxiliary receiver 340) may provide a weatherproof enclosure to protect RF antenna 310, LTE control module 320, BHR 330, PS auxiliary receiver 340, and/or other components of LTE unit 117. Radome 350 may include any RF transparent structure that protects components in an outdoor environment.

Although FIG. 3 shows example components of LTE unit 117, in other implementations, LTE unit 117 may include fewer components, different components, differently arranged components, and/or additional components than depicted in FIG. 3. Alternatively, or additionally, one or more components of LTE unit 117 may perform one or more tasks described as being performed by one or more components of LTE unit 117.

Figure 4:
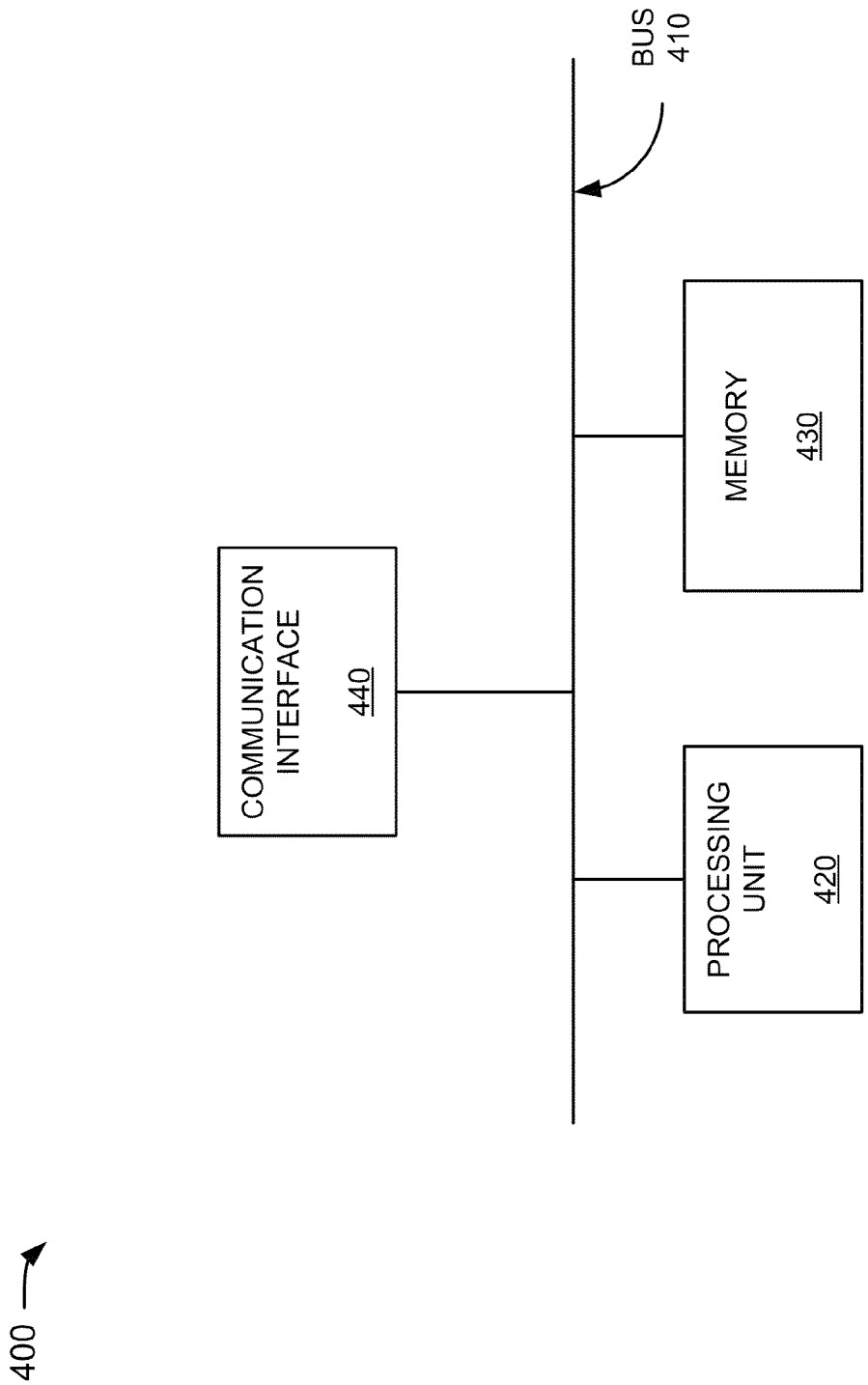
FIG. 4 is a diagram of example components of the LTE control module and/or BHR, as shown in FIG. 3.

FIG. 4 is a diagram of example components of LTE control module 320 and/or BHR 330, labeled as device 400. As shown in FIG. 4, device 400 may include a bus 410, a processing unit 420, a memory 430, and a communication interface 440.

Bus 410 may permit communication among the components of device 400. Processing unit 420 may include one or more processors, microprocessors, or processing logic (e.g., application specific integrated circuits (ASICs) or field programmable gate arrays (FPGAs)) that may interpret and execute instructions.

Memory 430 may include a random access memory (RAM) or another type of dynamic storage device that stores information and instructions for execution by processing unit 420, a read only memory (ROM) or another type of static storage device that stores static information and instructions for processing unit 420, and/or some other type of memory device.

Communication interface 440 may include any transceiver-like mechanism that enables device 400 to communicate with other devices and/or systems. For example, communication interface 440 may include mechanisms for communicating with other devices, such as other devices of system 100 and/or customer premises 110 via a wireless connection and/or a wired connection.

As described herein, device 400 may perform certain operations in response to processing unit 420 executing software instructions contained in a computer-readable medium, such as memory 430. A computer-readable medium may be defined as a non-transitory memory device. A memory device may include memory space within a single physical memory device or spread across multiple physical memory devices. The software instructions may be read into memory 430 from another computer-readable medium or from another device via communication interface 440. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more tasks described as being performed by one or more other components of device 400.

Figure 5:
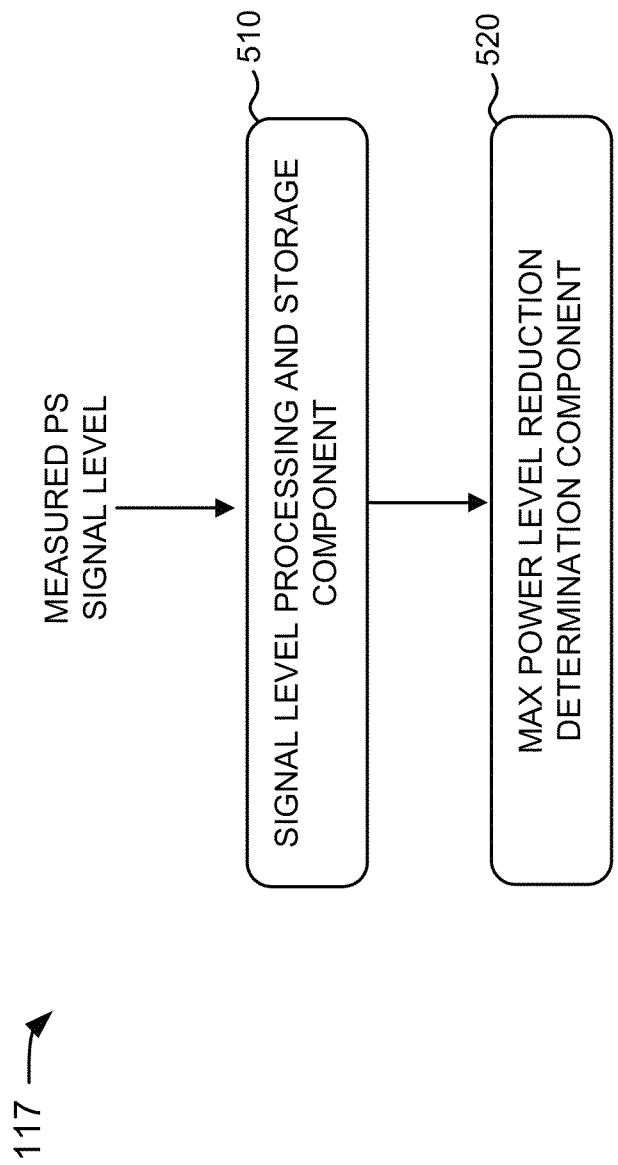
FIG. 5 is a diagram illustrating an example of functional components of the LTE unit.

FIG. 5 is a diagram illustrating an example of functional components of a portion of LTE unit 117, such as functional components implemented by LTE control module 320 and/or BHR 330. In one implementation, the functional components described in connection with FIG. 5 may be implemented via, for example, processing unit 420 executing instructions contained in memory 430. As shown in FIG. 5, LTE unit 117 may include signal level processing and storage component 510 and max power level reduction determination component 520.

Signal level processing and storage component 510 may receive the measured public safety signal level, as measured by PS auxiliary receiver 340. At each measurement interval, PS auxiliary receiver 340 may perform multiple non-coherent scans and correspondingly generate multiple measurements. Signal level processing and storage component 510 may process the measured PS signal levels, such as by, for example, filtering, averaging, or smoothing the measured PS signal levels in such a way as to increase the probability of accurately assessing the presence and signal strength corresponding to a nearby wireless PS network 130. Signal level processing and storage component 510 may store an indication of the measured strength of the public safety signal and/or an indication of whether a wireless public safety network is in the vicinity of LTE unit 117.

Max power level reduction determination component 520 may include logic to determine, based on the output of signal level processing and storage component 510, whether LTE unit 117 should reduce its transmission power level. When a decision to reduce the power level is made, a number of techniques can be used to perform the reduction. For example, additional maximum power reduction (A-MPR), as defined by the 3GPP technical specification 3GPP 36.101, may be applied on a per-sector basis. Alternatively or additionally, A-MPR may be applied on a per-device basis, such as by LTE unit 117 of customer premises 110, or using other maximum power reduction techniques. The operation of max power level reduction determination component 520 will be described in more detail below.

Figure 6:
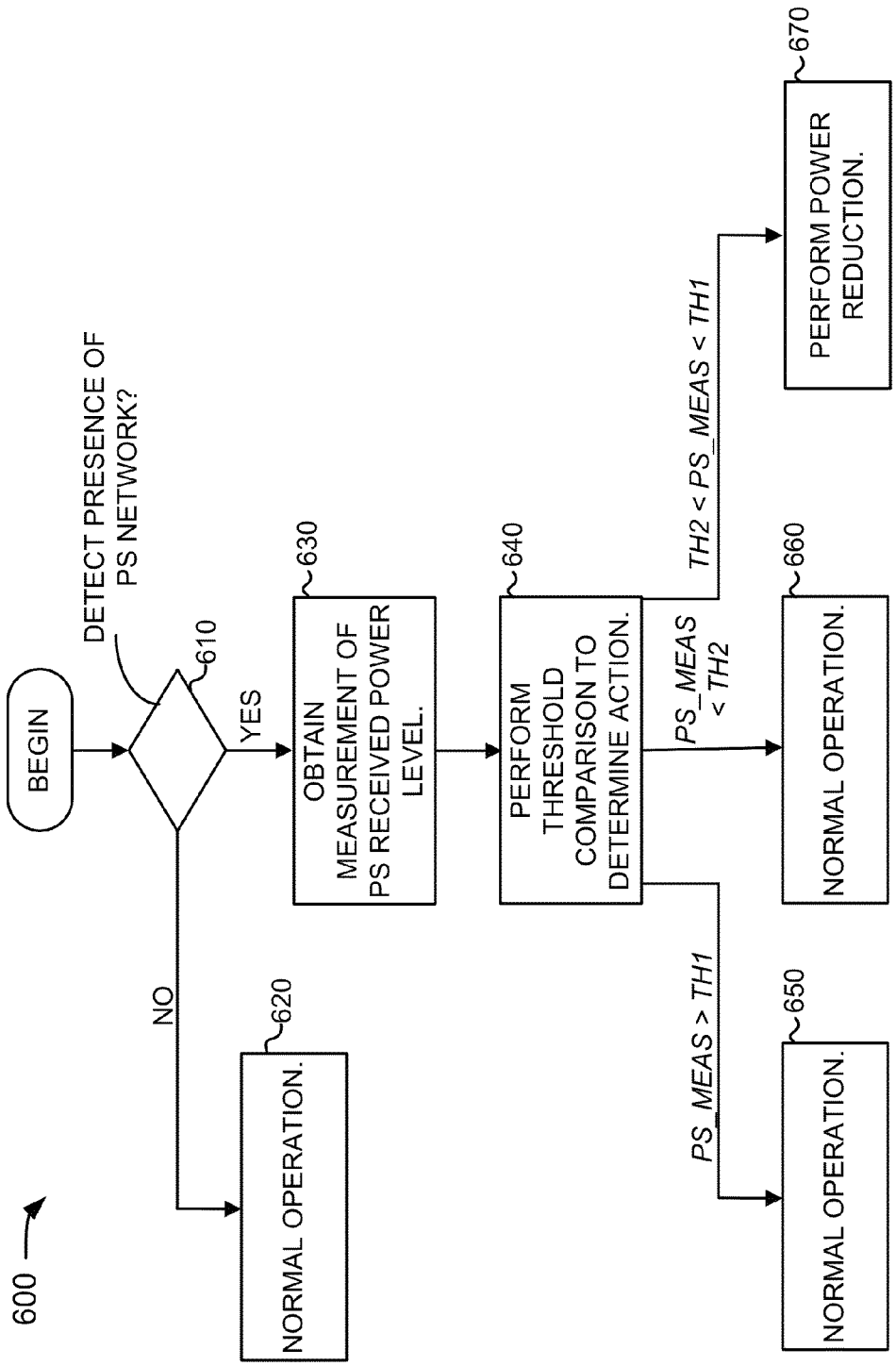
FIG. 6 is a flow diagram illustrating a process for performing interference reduction with a wireless public safety network.

FIG. 6 is a flow diagram illustrating a process 600 for performing interference reduction with wireless PS network 130 by LTE unit 117 at customer premises 110. In one implementation, the process of FIG. 6 may be performed by LTE unit 117. In another implementation, some or all of process 600 may be performed by another device or group of devices, including or excluding LTE unit 117.

Process 600 may include detecting the presence of a wireless PS network (block 610). The presence of wireless PS network 130 may be detected, for example, by signal level processing and storage component 510 whenever there is radio activity in the frequency band corresponding to the PS network. When the PS network is not detected (block 610—NO), LTE unit 117 may continue to operate as normal (block 620). In other words, LTE unit 117 may transmit to LTE network 120 using normal power transmission levels.

When, however, the presence of the PS network is detected, (block 610—YES), the measured power level of the PS network may be obtained (block 630). For example, signal level processing and storage component 510 may record multiple measurements of PS network signal levels and calculate an average or smoothed signal level value. The averaging or smoothing may be performed, for example, over a predetermined time period (e.g., 30 seconds).

Process 600 may further include using the measured power level to perform a threshold comparison (block 640). The threshold comparison may be performed to determine whether LTE unit 117 should reduce its maximum transmission power. In one implementation, the measured PS power level may be compared against two thresholds, called TH1 and TH2 herein, that are used to define the boundary of the cell area of base station 135. The threshold values may be obtained by LIE unit 117 from, for example, an initial configuration of LIE unit 117 or may be received dynamically from network operations center 150 and/or device manager 170.

If the measured PS power level (PS_MEAS) is greater than the first threshold (TH1), this may indicate that the signal strength of wireless PS network 130, at the location of LTE unit 117, is strong. The PS terminals, in the vicinity of LTE unit 117, may thus be in a strong signal area (not at a cell edge) and the PS terminals may be able to apply a power margin to compensate for fading or external interference from LTE unit 117 (e.g., PS_MEAS may be several dBs above the PS terminal sensitivity). In this situation, which may correspond to PS terminal 280-1 in FIG. 2, LTE unit 117 may continue to operate normally (block 650). In other words, LTE unit 117 may transmit to LTE network 120 using normal power transmission levels.

When, however, the measured PS power level (PS_MEAS) is less than the second threshold (TH2), this may indicate that the signal strength of wireless PS network 130, at the location of LTE unit 117, is too weak to allow a reliable connection between base station 135 and the PS terminals in the vicinity of LTE unit 117. In FIG. 2, for example, this situation may correspond to PS terminal 280-3. TH2 may be selected at or below the receiver sensitivity of the PS terminal. In this situation, LTE unit 117 may continue to operate normally (block 660). In other words, LTE unit 117 may transmit to LTE network 120 using normal power transmission levels.

When the measured PS power level is between the first and second thresholds (i.e., TH2<PS_MEAS<TH1), this may indicate an LTE unit 117 is near a cell boundary of a base station 135 (i.e., near an edge of the cell boundary). In FIG. 2, this situation may correspond to PS terminal 280-2. In this situation, max power level reduction termination component 520 may determine to perform power level reduction in order to reduce potential interference with PS terminals attempting to communicate with wireless PS network 130 (block 670).

A number of possible power level reduction techniques may be performed in block 670. The power level reduction techniques may be performed independently by LTE unit 117. Alternatively or additionally, LTE unit 117 may inform LTE network 120 of the result of the threshold comparison, which may result in LTE network 120 performing network level or cell level power reduction techniques.

As one example of a possible power reduction technique, PUCCH over-dimensioning, as defined by the LTE standard, may be applied to all the LTE terminals, including LTE unit 117, that are within the cell of interest (e.g., the cell corresponding to the eNodeB 125 with which LTE unit 117 communicates). Additional maximum power reduction (A-MPR) may be performed by LTE unit 117. Thus, in this technique for power level reduction, both cell wide power reduction and per-device (LTE unit 117) A-MPR may be performed.

Another technique that may potentially be performed in block 670 may include wideband power reduction of the uplink signal from LTE unit 117. The wideband power reduction may be proportional to the proximity of LTE unit 117 to the cell edge in wireless PS network 130. In this situation, the amount of power reduction may be constrained by the remaining power headroom at that particular location, for an unconstrained system. For example, expected typical values may be in the range of 0 to 8 dB. This technique may, in some situations, limit control channel coverage and may thus be used only for LTE units 117 in close proximity to an eNodeB 125.

Another technique that may potentially be performed in block 670 may include a combination of wideband power reduction and device specific A-MPR. In yet another possible technique performed in block 670, A-MPR may be enabled for all the user equipment devices connected to eNodeB 125 corresponding to LTE unit 117.

Interference reduction with respect to wireless PS network 130, as described above, used PS auxiliary receiver 340 to detect the presence of a PS network. In an alternative embodiment, as will now be described, PS auxiliary receiver 340 may not be needed. Instead, information relating to wireless PS network 130 may be received over LTE network 120, such as from network operations center 150 and/or device manager 170. Alternatively, PS auxiliary receiver 340 may still be used in conjunction with information received over LTE network 120. The information relating to wireless PS network 130 may be used to determine when to perform power reduction.

FIG. 7 is a diagram of example components of a device 700 according to an implementation described herein. Device 700 may correspond to or be included within network operations center 150, device manager 170, and/or other components of FIG. 1. As shown, device 700 may include a bus 710, a processor 720, a memory 730, an input device 740, an output device 750, and a communication interface 760.

Bus 710 may permit communication among the components of device 700. Processor 720 may include one or more processors and/or microprocessors that interpret and execute instructions. Additionally or alternatively, processor 720 may be implemented as or include one or more ASICs, FPGAs, or the like. Memory 730 may include a RAM or another type of dynamic storage device that stores information and instructions for execution by processor 720, a ROM or another type of static storage device that stores static information and instructions for the processor 720, and/or some other type of magnetic or optical recording medium and its corresponding drive for storing information and/or instructions.

Input device 740 may include a device that permits an operator to input information to device 700, such as a keyboard, a keypad, a mouse, a pen, a microphone, a touch screen, one or more biometric mechanisms, and the like. Output device 750 may include a device that outputs information to the operator, such as a display, a speaker, etc.

Communication interface 760 may include any transceiver-like mechanism that allows device 700 to communicate with other devices and/or systems. For example, communication interface 760 may include mechanisms for communicating with components, such as LTE unit 117.

As will be described in detail below, device 700 may perform certain functions in response to processor 720 executing software instructions contained in a computer-readable medium, such as memory 730. The software instructions may be read into memory 730 from another computer-readable medium or from another device via communication interface 760. The software instructions contained in memory 730 may cause processor 720 to perform processes that will be described later. Alternatively, hardwired circuitry may be used in place of or in combination with software instructions to implement processes consistent with embodiments described herein. Thus, systems and methods described herein are not limited to any specific combination of hardware circuitry and software.

Although FIG. 7 illustrates example components of device 700, in some implementations, device 700 may include fewer components, different components, differently arranged components, or additional components than those depicted in FIG. 7. Additionally, or alternatively, one or more components of device 700 may perform one or more tasks described as being performed by one or more other components of device 700.

FIGS. 8A and 8B are diagrams illustrating an example of data structures that may be implemented by device 700.

As shown in FIG. 8A, data structure 800 may relate LTE units 117 in LTE network 120 to the geographical location of the LTE unit. As shown, data structure 800 may include LTE unit field 810 and a location field 820. LTE unit field 810 may identify, for each entry in data structure 800, a particular LTE unit 117. LTE unit field 810 may include, for example, a label, a unique identifier such as an International Mobile Subscriber Identity (IMSI), an address (e.g., a MAC address), or another type of identification for the LTE unit. Location field 820 may include an indication of the location of the corresponding LTE unit identified in field 810. Location field 820 may include, for example, postal addresses or geographic coordinate addresses. In the example of FIG. 8A, location field 820 is particularly illustrated using latitude and longitude coordinate values. In general, the data structure 800 may include an entry for LTE unit 117 and each customer premises 110 associated with LTE Network 120. Location field 820 for a particular LTE unit 117 may be updated, for example, as part of the initial sale or provisioning of the LTE unit.

As shown in FIG. 8B, data structure 850 may include information relating to known PS base stations 135. Data structure 850 may include a PS base station field 860, a location field 870, and a range/power field 880. PS base station field 860 may identify, such as using a label or other identifier, known base stations 135. The existence of a particular base station may be obtained, for example, from government entities, from measurement of public safety spectrum usage (such as performed using the previously described embodiment using PS auxiliary receiver 340), or through other techniques.

Location field 870 may indicate the location of the corresponding public safety base station indicated in field 860. Location field 870 may include, for example, a postal address or a geographic coordinate addresses. In the example of FIG. 8B, location field 870 is particularly illustrated using latitude and longitude coordinate values.

Range/power field 880 may include one or more values indicating the known range and/or transmission power associated with the corresponding PS base station. For example, for PS base stations in which the approximate size of the cell is known, range/power field 880 may include a distance value indicating a radius of the cell. Alternatively, for a PS base station in which the broadcasting power of the cell is known, range/power field 880 may include a value indicating the power used by the base station, which may be used to derive the approximate size of the cell. In some implementations, the range/power of a PS base station may not be known or may not be needed, and in which case, range/power field 880 may not be used or may be empty for that particular PS base station.

Although FIGS. 8A and 8B show example data structures implemented by device 700, in other implementations, the data structures may include fewer fields, additional fields, or different fields.

FIG. 9 is a flow diagram illustrating a process 900 for performing interference reduction with wireless PS network 130 by device 700 and LTE unit 117 of customer premises 110. In one implementation, device 700 may include network operations center 150 and/or device manager 170.

Process 900 may include determining, for LTE units 117, nearby PS base stations based on the pre-stored information (e.g., based on data structures 800 and 850) (block 910). In one implementation, the nearby base stations may be determined based on the previously discussed pre-stored distance information. For each LTE unit 117, device 700 may calculate the distance between the geographic location specified by the corresponding location field 820 (FIG. 8A) and the geographic locations specified by location field 870 for each PS base station (FIG. 8B). In one implementation, for each LTE unit 117, device 700 may rank the distances and store the pairs of PS base stations and LTE units 117 that fall below a maximum distance, dMax. The maximum distance may be, for example, a value determined by a network operator. In an alternative implementation, the nearby PS base stations or edge areas of the nearby PS base stations may be determined based on other known information. For example, cell edge areas for the PS network may be identified based on coverage prediction maps, by cell edge areas determined empirically via drive-by testing, or by a combination of coverage prediction maps and drive-by testing.

Process 900 may further include determining whether an action, relating to a power adjustment with respect to an LTE unit 117, should be taken based on a threshold comparison of the distances from the LTE units to the PS base stations (or edge areas of the cells determined for the PS base stations) (block 920). For example, in one implementation, for each pair of PS base stations and LTE units 117 that fall below the maximum distance, dMax, device 700 may perform the threshold comparison. The threshold comparison may include defining a first threshold distance, D1, and a second threshold distance, D2. The threshold distances D1 and D2 may be used similarly to TH1 and TH2 to define the boundaries for the cells of the PS base stations. D1 and D2 may be derived from or stored in range/power field 880 of data structure 850. Alternatively, D1 and D2 may be determined in a different manner, such as through a manual determination by an administrator.

If the calculated distance between an LTE unit 117 and a PS base station (D_LTE) is less than the first threshold (D1), this may indicate that the signal strength of wireless PS network 130 should be strong in the vicinity of LTE unit 117. The PS terminals, in the vicinity of LTE unit 117, may thus be in a strong signal area (not at a cell edge) and the PS terminals may be able to apply a power margin to compensate for fading or external interference from LTE unit 117. In this situation, LTE unit 117 may continue to operate normally (block 930). In other words, LTE unit 117 may transmit to LTE network 120 using normal power transmission levels.

When, however, the calculated distance, D_LTE, is greater than the second threshold (D2), this may indicate that any nearby PS terminals are too far from base station 135 of the PS wireless network and, thus, a reliable connection between base station 135 and the PS terminal will not be obtained. In FIG. 2, for example, this situation may correspond to PS terminal 280-3. In this situation, LTE unit 117 may continue to operate normally (block 940). In other words, LTE unit 117 may transmit to LTE network 120 using normal power transmission levels.

When D_LTE is between the first and second thresholds (i.e., D2>D_LTE>D1), this may indicate an LTE unit 117 is near a cell boundary (i.e., a cell edge area) of a base station 135. In FIG. 2, this situation may correspond to PS terminal 280-2. Power reduction may be performed (block 950).

In process 900, network operations center 150 and/or device manager 170 may communicate the result of the power reduction determination (e.g., normal operation or power reduction) to the affected LTE units 117, as necessary. For example, whenever there is an update to data structures 800 or 850, process 900 may be performed for all LTE units 117. When the result of process 900 indicates a change in a power reduction state for a particular LTE unit 117, network operations center 150 and/or device manager 170 may communicate this change by sending a message, such as using the known TR-069 protocol, to the LTE unit 117.

A number of possible power level reduction techniques, similar to those discussed above with respect to block 670, may be performed to implement power reduction (e.g., in block 950).

For example, PUCCH over-dimensioning, as defined by the LTE standard, may be applied to all the LTE terminals, including LTE unit 117, that are within the cell of interest (e.g., the cell corresponding to the eNodeB 125 with which LTE unit 117 communicates). Additional maximum power reduction (A-MPR) may be performed by LTE unit 117. Thus, in this technique for power level reduction, both cell wide power reduction and per-device (LTE unit 117) A-MPR may be performed.

Another technique that may potentially be performed in block 950 may include wideband power reduction of the uplink signal from LTE unit 117. The wideband power reduction may be proportional to the proximity of LTE unit 117 to the cell edge in wireless PS network 130. In this situation, the amount of power reduction may be constrained by the remaining power headroom at that particular location, for an unconstrained system. For example, expected typical values are in the range of 0 to 8 dB. This technique may, in some situations, limit control channel coverage and may thus be used only for LTE units 117 in close proximity to an eNodeB 125.

Another technique that may potentially be performed in block 950 may include a combination of wideband power reduction and device specific A-MPR. In yet another possible technique performed in block 950, A-MPR may be enabled for all the user equipment devices connected to eNodeB 125 corresponding to LTE unit 117.

Intelligent interference reduction for PS networks, as described above, may provide a spectrally efficient mechanism for controlling power reduction by fixed LTE terminals in the event of the detection of a PS network. Only terminals located at PS cell edges may be controlled to reduce power transmission levels, which may advantageously allow for normal operation by other terminals in the eNodeBs cell. Advantageously, the need to use PUCCH over-provisioning and/or A-MPR for all terminals in a cell may be obviated.

The foregoing description of implementations, described above, provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 9, the order of the blocks may be modified in other implementations. Further, non-dependent blocks may be performed in parallel.

Also, certain portions of the implementations may have been described as a "component" or "module" that performs one or more functions. The terms "component" and "module" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a fixed terminal communicating through a Long Term Evolution (LTE) wireless network, a signal strength of radio signals from a public safety wireless network, which is different from the first wireless network, which is different from the first wireless network;
   performing, by the fixed terminal, a threshold comparison of the signal strength with respect to multiple threshold values, to determine whether the fixed terminal is located in an edge area of a cell of the public safety wireless network or is located outside the edge area of the cell of the public safety wireless network; and
   reducing, by the fixed terminal, a transmission power of the fixed terminal, with respect to radio transmissions to the LTE wireless network, responsive to results of the threshold comparison indicating that the fixed terminal is located in the edge area of the cell of the public safety wireless network.

2. The method of claim 1, further comprising:
   transmitting, by the fixed terminal, the radio transmissions using a normal transmission power responsive to the results of the threshold comparison indicating that the fixed terminal is located outside the edge area of the cell of the public safety wireless network.

3. The method of claim 1, wherein the results of the threshold comparison indicating that the fixed terminal is located in the edge area corresponds to determining that the signal strength is greater than a first threshold value and less than a second threshold value.

4. The method of claim 1, where reducing the transmission power of the fixed terminal includes:
   performing additional maximum power reduction (A-MPR), as defined according to Long Term Evolution (LIE) standard, on a per-terminal basis.

5. The method of claim 1, wherein reducing the transmission power of the fixed terminal includes:
   performing wide band power reduction, of the fixed terminal, with respect to the radio transmissions to the first wireless network.

6. The method of claim 1, further comprising:
   determining, by the fixed terminal, whether the fixed terminal is in a presence of the public safety network, wherein the determining the signal strength is performed responsive to a determination that the fixed terminal is in the presence of the public safety network.

7. The method of claim 1, wherein determining the signal strength comprises:
   measuring, using an auxiliary receiver tuned to a frequency band of the public safety wireless network, the signal strength of the radio signals from the public safety wireless network.

8. A device comprising:
   a radiofrequency antenna;
   a control module to control wireless communications for a Long Term Evolution (LTE) based network, through the antenna within a first frequency band, wherein the device operates as a fixed terminal in the LTE based network; and
   a receiver to measure wireless communications, in a second frequency band, for a public safety wireless network, the receiver measuring a signal strength value corresponding to the wireless communications in the public safety wireless network,
   wherein the control module is configured to:
      compare the measured signal strength value to multiple threshold values to determine whether the device is located in an edge area of the public safety wireless network or is not located in the edge area of the public safety wireless network, and
      selectively control, based on results of the comparing of the measured signal strength value to the multiple threshold values, a reduction of power by the device when transmitting over the first frequency band in the edge area of the public safety wireless network.

9. The device of claim 8, where the measured signal strength value is a smoothed signal strength value.

10. The device of claim 8, wherein the receiver passively measures the signal strength value of the wireless communications in the public safety wireless network.

11. The device of claim 8, where, when selectively controlling the reduction of power, the device is to perform additional maximum power reduction (A-MPR), as defined according to Long Term Evolution (LTE) standard, on a per-device basis.

12. The device of claim 8, where, when selectively controlling the reduction of power, the device is to perform wideband power reduction, of the device, when communicating with the public safety wireless network.

13. A method comprising:
   storing, by a server device connected to a Long Term Evolution (LTE) wireless network, locations of a plurality of fixed terminals in the LTE wireless network;
   storing, by the server device, locations of a plurality of base stations in one or more public safety wireless networks;
   calculating, by the server device, distances between the locations corresponding to pairs of the base stations and the fixed terminals;
   determining by the server device and based on the calculated distances:
      first fixed terminals, of the plurality of fixed terminals, are located in an edge area of a cell of one of the plurality of base stations of the one or more public safety wireless networks,
      second fixed terminals, of the plurality of fixed terminals, that are located beyond the edge area of the cell, and
      third fixed terminals, of the plurality of fixed terminals, that are located inside the edge area of the cell; and
   transmitting, by the server device and to the first fixed terminals, an indication that the first fixed terminals are to reduce transmission power with respect to transmissions to the LTE wireless network.

14. The method of claim 13, wherein determining the first fixed terminals that are located in the edge area of the cell includes:
   performing a threshold comparison of the calculated distances to multiple threshold distance values to determine that the first fixed terminals are located in the edge area of the cell.

15. The method of claim 13, wherein reducing the transmission power with respect to transmission to the LTE wireless network includes:
   performing additional maximum power reduction (A-MPR), as defined according to Long Term Evolution (LTE) standard, on a per-terminal basis.

16. The method of claim 13, wherein reducing the transmission power with respect to transmissions to the LTE wireless network includes:
   performing wideband power reduction, by the first fixed terminals that are located in the edge area of the cell, when communicating with the LTE wireless network.

17. The method of claim 13, further comprising:
a range or power value, associated with each of the plurality of base stations, where the range/power value is used to determine the edge area of the cell of one of the plurality of base stations.

18. A system comprising:
a server device, coupled to a Long Term Evolution (LIE) wireless network, the server device to:
store locations of a fixed terminal in the LTE wireless network;
store information relating to a plurality of base stations in one or more public safety wireless networks;
calculate distances between the information relating to the base stations and the fixed terminal;
determine, based on results of a comparison of the calculated distances to multiple threshold distance values, whether the fixed terminal is at an edge area of coverage of the plurality of base stations; and
transmit, in response to a determination that the fixed terminal is at the edge area, a message to the fixed terminal instructing the fixed terminal to reduce transmission power with respect to transmissions to the LTE wireless network.

19. The system of claim 18, where the information relating to the plurality of base stations includes locations of the plurality of base stations.

20. The system of claim 18, where the information relating to the plurality of base stations includes edge areas of cells defined by the plurality of base stations, where the edge areas are determined by one or both of coverage prediction maps and empirical drive-by testing data.

* * * * *